US012650042B2

(12) United States Patent
Holzapfel et al.

(10) Patent No.: US 12,650,042 B2
(45) Date of Patent: Jun. 9, 2026

(54) LONGITUDINAL EDGE FIXING DEVICE FOR FURNITURE HINGE

(71) Applicant: Julius Blum GmbH, Hoechst (AT)

(72) Inventors: Andreas Holzapfel, Bregenz (AT); Philip Schluge, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 70 days.

(21) Appl. No.: 17/527,745

(22) Filed: Nov. 16, 2021

(65) Prior Publication Data

US 2022/0074248 A1 Mar. 10, 2022

Related U.S. Application Data

(63) Continuation of application No. PCT/AT2020/060151, filed on Apr. 15, 2020.

(30) Foreign Application Priority Data

May 17, 2019 (AT) .............................. A 50450/2019

(51) Int. Cl.
*E05D 5/02* (2006.01)
*E05D 7/12* (2006.01)
*A47B 95/00* (2006.01)

(52) U.S. Cl.
CPC ........... *E05D 5/0276* (2013.01); *E05D 7/125* (2013.01); *A47B 2095/006* (2013.01); *E05Y 2600/504* (2013.01); *E05Y 2900/20* (2013.01)

(58) Field of Classification Search
CPC ... F16B 12/2009; E05F 1/1058; E05F 1/1261; A47B 2220/0069; A47B 2220/0072;
(Continued)

(56) References Cited

U.S. PATENT DOCUMENTS 968,764 A * 8/1910 Gottschall ................. E05D 5/08 16/272
3,508,306 A * 4/1970 Wright ................ F16B 12/2009 411/549

(Continued)

FOREIGN PATENT DOCUMENTS

CN 1849200 10/2006
DE 295 06 600 10/1995

(Continued)

OTHER PUBLICATIONS

International Search Report issued Jul. 6, 2020 in International (PCT) Application No. PCT/AT2020/060151.

*Primary Examiner* — Emily M Morgan
(74) *Attorney, Agent, or Firm* — Wenderoth, Lind & Ponack, L.L.P.

(57) ABSTRACT

A furniture fitting includes a first fitting part for fastening to a furniture body and a second fitting part for fastening to a movably mounted furniture part. The two fitting parts can be pivotally interconnected, and at least one of the two fitting parts is designed to be arranged in a recess in the furniture body or the movably mounted furniture part. The furniture fitting includes a fastening device for fastening the fitting part in the recess, the fastening device including a rotatably mounted actuating element and at least two fastening elements to be recessed in or pressed against a wall of the recess. A coupling device can convert a rotation of the actuating element into a recessing and/or pressing movement of the fastening elements. The actuating element and the fastening elements are arranged on the same side of the fitting part and spaced apart in a longitudinal direction.

31 Claims, 9 Drawing Sheets

(58) Field of Classification Search
CPC ........... E05D 7/12; E05D 7/123; E05D 7/125; E05D 5/0276; E05D 3/06; E05D 5/08; E05Y 2900/20
See application file for complete search history.

(56) References Cited

U.S. PATENT DOCUMENTS

| | | | | | |
|---|---|---|---|---|---|
| 3,695,655 | A * | 10/1972 | Wippermann | F16B 12/2054 | 411/72 |
| 3,969,787 | A * | 7/1976 | Rock | E05D 5/0276 | 16/238 |
| 4,312,098 | A * | 1/1982 | Sundermeier | E05D 5/0276 | 16/240 |
| 4,839,940 | A * | 6/1989 | Grass | E05D 7/125 | 16/382 |
| 5,025,530 | A * | 6/1991 | Ferrari | E05D 7/125 | 16/382 |
| 5,246,322 | A * | 9/1993 | Salice | F16B 12/2027 | 411/15 |
| 5,463,796 | A | 11/1995 | Brüstle et al. | | |
| 5,561,888 | A * | 10/1996 | Lautenschlager | E05D 3/142 | 16/382 |
| 5,613,796 | A * | 3/1997 | Salice | F16B 12/2009 | 403/374.5 |
| 5,715,577 | A * | 2/1998 | Lautenschlager | E05D 5/08 | 16/383 |
| 5,937,479 | A * | 8/1999 | Ohshima | E05D 7/125 | 16/257 |
| 6,081,970 | A * | 7/2000 | Wasilewski | E05D 7/125 | 16/383 |
| RE37,236 | E | 6/2001 | Brüstle et al. | | |
| 7,197,968 | B2 | 4/2007 | Bubel | | |
| 10,246,915 | B2 * | 4/2019 | Brunnmayr | E05D 3/14 | |
| 11,319,737 | B2 | 5/2022 | Nordieker et al. | | |
| 12,037,825 | B2 * | 7/2024 | Boesch | E05D 3/06 | |
| 2005/0178251 | A1 | 8/2005 | Holland-Letz | | |
| 2006/0016300 | A1 | 1/2006 | Bubel | | |
| 2008/0022491 | A1 * | 1/2008 | Campbell | E05D 7/12 | 16/236 |
| 2008/0250604 | A1 * | 10/2008 | Chen | E05D 11/1014 | 16/225 |
| 2017/0292301 | A1 * | 10/2017 | Hirtsiefer | E05D 5/08 | |
| 2019/0316396 | A1 * | 10/2019 | Kruedener | F16B 12/50 | |
| 2021/0115714 | A1 * | 4/2021 | Duer | E05D 5/0276 | |
| 2021/0189780 | A1 | 6/2021 | Nordieker et al. | | |
| 2021/0270070 | A1 * | 9/2021 | Holzapfel | A47B 96/20 | |
| 2022/0018174 | A1 * | 1/2022 | Güzeltepe | E05F 1/1058 | |
| 2022/0195768 | A1 * | 6/2022 | Schneider | E05F 1/1253 | |
| 2023/0030015 | A1 * | 2/2023 | Boesch | E05D 15/40 | |

FOREIGN PATENT DOCUMENTS

| | | | | |
|---|---|---|---|---|
| EP | 0 610 765 | | 8/1994 | |
| EP | 2 282 067 | | 2/2011 | |
| EP | 2282067 | A1 * | 2/2011 | E05D 5/08 |
| EP | 3 034 734 | | 6/2016 | |
| EP | 3 173 556 | | 5/2017 | |
| EP | 3 401 476 | | 11/2018 | |
| EP | 3 401 482 | | 11/2018 | |
| GB | 2458987 | | 10/2009 | |
| JP | 2007-504960 | | 3/2007 | |

* cited by examiner

LONGITUDINAL EDGE FIXING DEVICE FOR FURNITURE HINGE

BACKGROUND OF THE INVENTION

The invention concerns a furniture fitment for moveably mounting a furniture part, preferably a furniture flap, relative to a furniture carcass, including a first fitment part for fixing to the furniture carcass and a second fitment part for fixing to the moveably mounted furniture part, wherein the two fitment parts are or can be pivotably connected together and at least one of the two fitment parts, preferably the first fitment part, is adapted to be arranged at least region-wise and preferably completely in a recess in the furniture carcass or in the moveably mounted furniture part. The invention further concerns an article of furniture comprising a furniture carcass, at least one furniture part, preferably a furniture flap, mounted moveably relative to the furniture carcass, preferably about a horizontal axis, and at least one and preferably precisely two above-mentioned furniture fitments, wherein the first fitment part of the at least one furniture fitment is fixed to the furniture carcass and the second fitment part of the at least one furniture fitment is fixed to the moveably mounted furniture part.

Furniture fitments can be fixed to a side wall of the furniture carcass by way of screws.

A trend which is to be found recently aims at at least partially integrating the furniture fitments into a wall of the furniture carcass and/or the moveable furniture part. In that case fixing by means of screws is generally not possible for stability reasons and/or would adversely affect the advantageous aesthetic appearance afforded by integration.

SUMMARY OF THE INVENTION

The object of the present invention is to provide a furniture fitment which is improved over the state of the art and an article of furniture having at least one such furniture fitment, in which the above-mentioned disadvantages are at least partially remedied, wherein the furniture fitment, in particular with at least partial integration, permits secure stable mounting of the at least one furniture part to the furniture carcass without adversely affecting the aesthetic appearance.

In the furniture fitment according to the invention, the furniture fitment includes at least one fixing device for fixing the at least one fitment part in the recess, wherein the at least one fixing device includes at least one rotatably mounted actuating element and at least two fixing elements which can be at least region-wise sunk in a wall of the recess and/or can be pressed against the wall, wherein there is provided a coupling device with which a rotary movement of the at least one actuating element can be converted into a sinking movement and/or a pressing movement of the at least two fixing elements, wherein the at least one actuating element and the at least two fixing elements are arranged at a same side, preferably at a longitudinal side, of the at least one fitment part and spaced from each other in a longitudinal direction of the at least one fitment part.

The furniture fitment therefore already includes at least one fixing device with which the at least one fitment part and thus the furniture fitment overall can be fixed in the recess in the furniture carcass or in the moveably mounted furniture part. Additional screws or the like are not necessary.

The at least one fitment part can be securely and stably fixed in the recess by the at least two fixing elements without that being visible from the exterior.

In addition, apart from the recess itself, no further fixing holes or the like are necessary, and that is advantageous in particular in relation to industrial furniture production.

The fact that the at least two fixing elements are arranged at a same side, preferably at a longitudinal side, of the at least one fitment part and spaced from each other in a longitudinal direction of the at least one fitment part means that the at least one fitment part can be securely and stably fixed even over a large region of the wall of the recess.

A further advantage is that fixing of the at least one fitment part and thus the furniture fitment overall is possible by single actuation of the at least one actuating element. In the state of the art, in comparison therewith, a plurality of actuating elements have to be actuated at different locations on the furniture fitment in order to implement fixing. That involves on the one hand an increased amount of time. On the other hand in that case there is the risk that one of the actuating elements is not actuated or is only incompletely actuated so that the furniture fitment is not fixed in the prescribed fashion.

It has proven to be particularly advantageous if there is provided at least one overload protection means to limit a tightening torque of the at least one actuating element. That can ensure that the furniture fitment or a part thereof and/or the furniture carcass and/or the furniture part is not damaged by fixing.

The overload protection means can be embodied for example if the at least one actuating element is made up at least of two parts, wherein the at least two parts are in at least region-wise frictionally locking contact with each other below a predetermined tightening torque so that a torque can be transmitted between the at least two parts and wherein the contact can be at least partially removed when the predetermined tightening torque is exceeded so that substantially no torque can be transmitted between the at least two parts.

In this connection, it has been found advantageous if one of the at least two parts of the at least one actuating element is in the form of a threaded sleeve and the other of the at least two parts is at least region-wise mounted rotatably within the threaded sleeve and/or there is provided at least one spring, preferably a compression spring, by way of which the at least two parts can be held in contact with a predetermined force and/or there is provided at least one friction surface with an increased friction, by way of which the at least two parts are at least region-wise in frictionally locking contact below the predetermined tightening torque.

It has proven to be advantageous if the at least two fixing elements are mounted rotatably about an axis of rotation which is oriented substantially perpendicularly or parallel to the longitudinal direction of the at least one fitment part, preferably wherein the at least two fixing elements are rotatable in the course of the sinking movement and/or the pressing movement in opposite directions of rotation about the axis of rotation. The fact that the at least two fixing elements are rotatable about the axis of rotation in opposite directions in the course of the sinking movement into the recess wall and/or the pressing movement has the advantage that a tightening torque generated by the sinking movement and/or the pressing movement, in a transverse and/or longitudinal direction of the at least one fitment part, can be at least partially mutually compensated.

It has proven to be desirable if the at least two fixing elements include at least one cutting element, preferably at least one cutting tooth and/or at least one cutting edge and/or at least one pressing element, preferably at least one pressing surface which can be oriented substantially parallel to the wall of the recess.

In that respect it can be provided that at least one of the fixing elements includes both at least one cutting element and also at least one pressing element.

In this connection it has proven to be advantageous if the at least one cutting element and the at least one pressing element are connected in one piece with the at least one fixing element.

Alternatively it can be provided that the at least one cutting element is arranged at a first component of the at least one fixing element and the at least one pressing element is arranged at a second component of the at least one fixing element, preferably wherein the first component comprises substantially a hard material, for example steel, and the second component comprises substantially a soft material, for example plastic, and/or wherein the first component is at least region-wise of a U-shaped configuration in cross-section and the second component is arranged at least region-wise between the limbs of the U-shape and/or wherein the first component and the second component bear at least region-wise sandwich-like against each other.

An embodiment in which the first component substantially comprises a hard material and the second component substantially comprises a soft material is distinguished in that both fixing to/in soft materials and also fixing to/in hard materials is possible. The first component of hard material is used for the soft materials like for example chipboard or soft wood and the second component of soft material is used for the hard materials like for example hard wood or a MDF board. In that way optimum fixing in the corresponding recess can be effected independently of the quality of the material of the furniture carcass or the furniture part.

An advantageous embodiment is distinguished in that there is provided at least one resetting force storage means which applies a resetting force to the at least two fixing elements at least in a direction transversely to the longitudinal direction of the at least one fitment part so that the at least two fixing elements can be at least region-wise sunk into and/or pressed against the wall of the recess in time-displaced relationship after a first fixing of the at least one fitment part in the recess. Once the furniture fitment is fitted to the furniture carcass or the furniture part it can happen that the fixing elements become loose again due to the movement of the furniture fitment or due to other circumstances. To deal with that effect it is appropriate to provide the above-described resetting force storage means.

The resetting force storage means can be arranged between a counterpart element, preferably with a counterpart thread, for the at least one actuating element and a carrier, at which the at least two fixing elements are arranged.

It has been found to be particularly advantageous if the at least one fitment part has a first longitudinal side at which the at least two fixing elements are arranged, wherein the at least one fitment part has a second longitudinal side which is opposite the first longitudinal side and at which at least one further fixing element is arranged, preferably wherein the at least one further fixing element is connected in motionally coupled relationship to the at least one fitment part and/or by the sinking movement and/or pressing movement of the at least two fixing elements arranged at the first longitudinal side can be sunk into an opposite wall of the recess and/or can be pressed against the opposite wall of the recess. It is possible in that way for the at least one fitment part to be securely fixed at two opposite sides by actuation of the at least one actuating element which is arranged at one side.

It has proven to be desirable if the furniture fitment has at least one actuating arm and a housing and the at least one actuating arm is displaceable between a closed position in which the at least one actuating arm is arranged substantially in the interior of the housing and at least one open position in which the at least one actuating arm is arranged at least region-wise outside the housing, preferably wherein there is provided at least one force storage means for applying force to the at least one actuating arm.

In particular in that connection, it is appropriate that disposed at an end of the at least one fitment part is an opening, by way of which the at least one actuating element of the at least one fixing device is actuable, more specifically even when the at least one actuating arm is arranged in a closed position.

As stated in the opening part of this specification protection is also claimed for a article of furniture comprising a furniture carcass, at least one furniture part, preferably a furniture flap, which is mounted moveably relative to the furniture carcass, preferably about a horizontal axis, and at least one and preferably precisely two furniture fitments according to the invention, wherein the first fitment part of the at least one furniture fitment is fixed to the furniture carcass and the second fitment part of the at least one furniture fitment is fixed to the moveably mounted furniture part.

In an advantageous configuration of the article of furniture it is provided that the furniture carcass includes at least one side wall, wherein at least one recess is arranged in the at least one side wall and the first fitment part is at least region-wise and preferably completely arranged in the at least one recess, preferably wherein the at least one recess and/or the first fitment part is of a substantially cuboidal configuration and the first fitment part is covered at at least four, preferably five, sides by a material of the at least one side wall.

Particularly for the situation involving a furniture fitment for moveably mounting a furniture flap about a horizontal axis it is appropriate if the at least one fixing device is arranged at an underside of the at least one fitment part and/or the at least one actuating element is accessible from an end of the at least one furniture fitment, that faces towards the user.

It has proven to be desirable if the at least one furniture fitment is moveable by the sinking movement and/or pressing movement of the at least two fixing elements in the vertical direction by 0.5 mm through 2.0 mm, preferably wherein the at least one furniture fitment is substantially immovable in the horizontal direction.

BRIEF DESCRIPTION OF THE DRAWINGS

Further details and advantages of the invention are described more fully hereinafter by means of the specific description with reference to the drawings in which.

DETAILED DESCRIPTION OF THE INVENTION

Figure 1A:
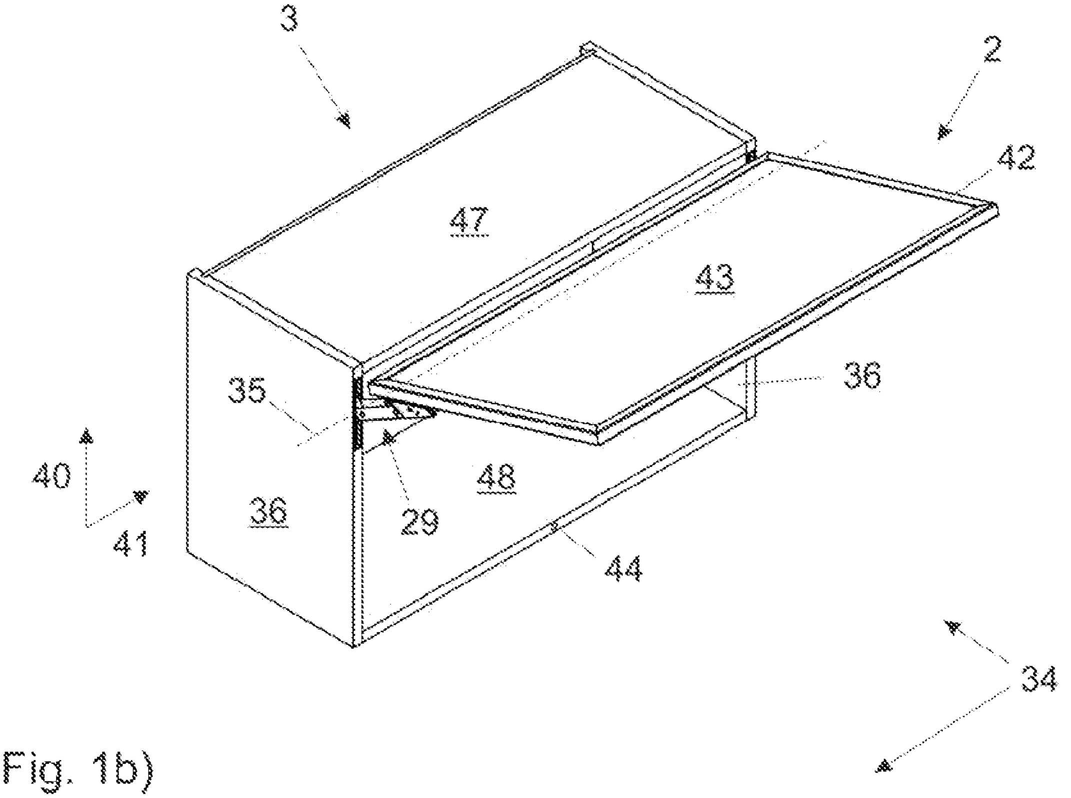
FIGS. 1*a, b* are diagrammatically illustrated perspective views of an article of furniture according to a preferred embodiment, wherein partial
Figure 1B:
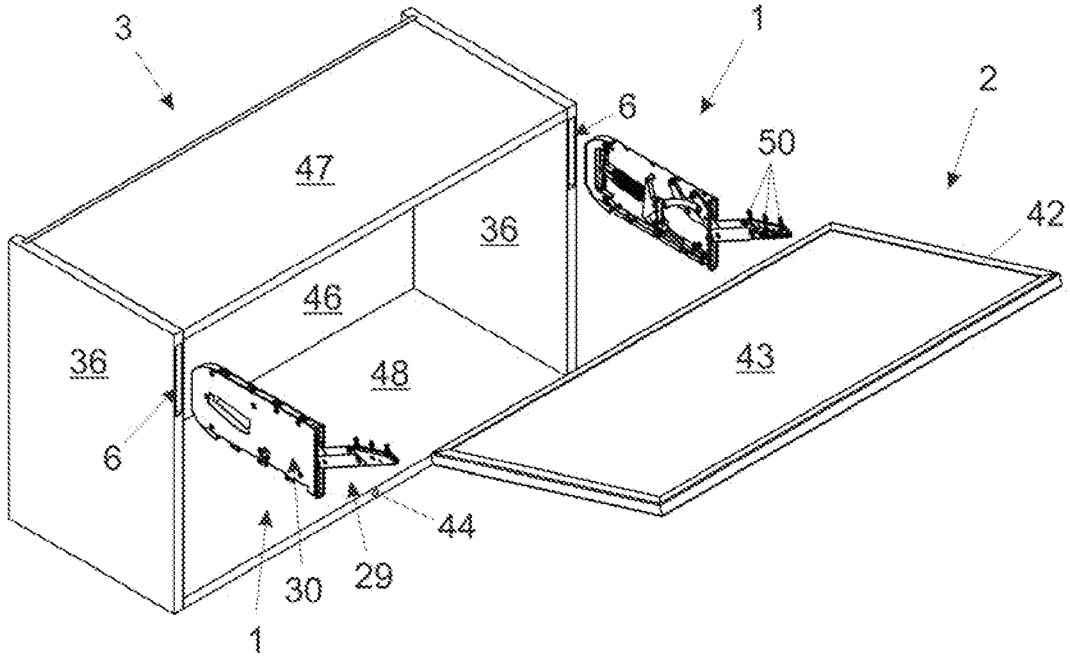
FIG. 1*b* shows the article of furniture in a partially dismantled state, FIGS. 2*a, b* are diagrammatically illustrated perspective views of an arrangement of a side wall of a furniture carcass and a furniture fitment, wherein the furniture fitment in partial

FIGS. 1*a* and 1*b* show an article of furniture 34 comprising a furniture carcass 3 (a furniture body), a furniture part 2 mounted moveably relative to the furniture carcass 3 and two furniture fitments 1 for moveably mounting the furniture part 2 relative to the furniture carcass 3.

As in the illustrated case the furniture part 2 can be a furniture flap moveable about a horizontal axis 35. The furniture part 2 can include a frame 42 with a glass insert 43.

The furniture fitments 1 each include a first fitment part 4 for fixing to the furniture carcass 3 and a second fitment part 5 for fixing to the moveably mounted furniture part 2, wherein the two fitment parts 4, 5 are or can be pivotably connected together and at least one of the two fitment parts 4, 5, in the illustrated embodiment being the first fitment part 4, is adapted to be at least region-wise and preferably completely arranged in a recess 6 in the furniture carcass 3 or in the moveably mounted furniture part 2.

In the assembled state which is shown in FIG. 1*a* the first fitment part 4 of the furniture fitments 1 is respectively secured to the furniture carcass 3 and the second fitment part 5 of the furniture fitments 1 is respectively fixed to the moveably mounted furniture part 2.

Fixing means 50, for example in the form of spreader dowels, can be arranged or can be designed to be fitted to the second fitment part 5, wherein the second fitment part 5 can be fixed to the furniture part 2 by means of the fixing means 50.

The furniture carcass 3 includes two side walls 36, in each of which is arranged a respective recess 6. The first fitment part 4 of the furniture fitments 1 is respectively arranged completely in the recesses 6.

The furniture carcass 3 can also include a rear wall, a top panel 47 and a bottom panel 48.

It is appropriate for the furniture part 2 to be designed without a handle. In that case there can be provided an ejection device 44 which can be integrated in the bottom panel 48.

Figure 2A:
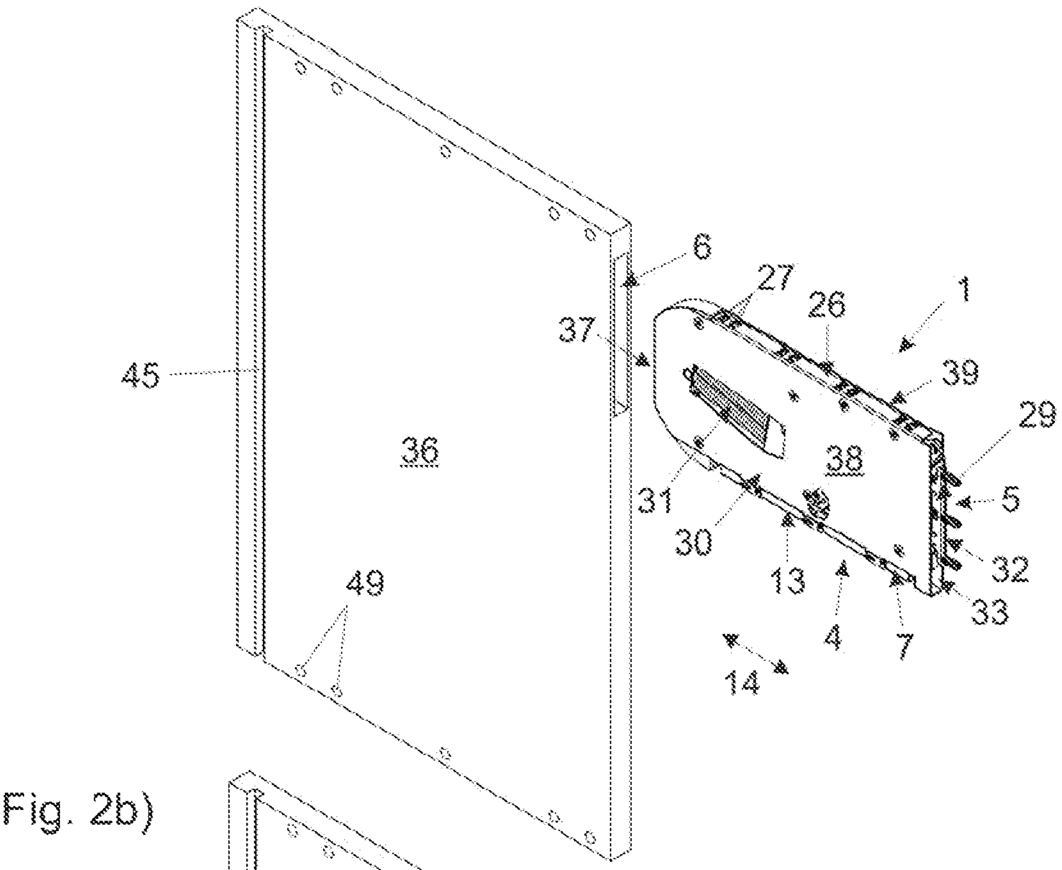
FIG. 2*a* is arranged outside the side wall and in partial FIG. 2*b* it is arranged in a recess in the side wall, FIGS. 3*a, b* show a furniture fitment according to a first preferred embodiment inserted in a recess in a side wall in the non-fixed state, wherein partial
Figure 2B:
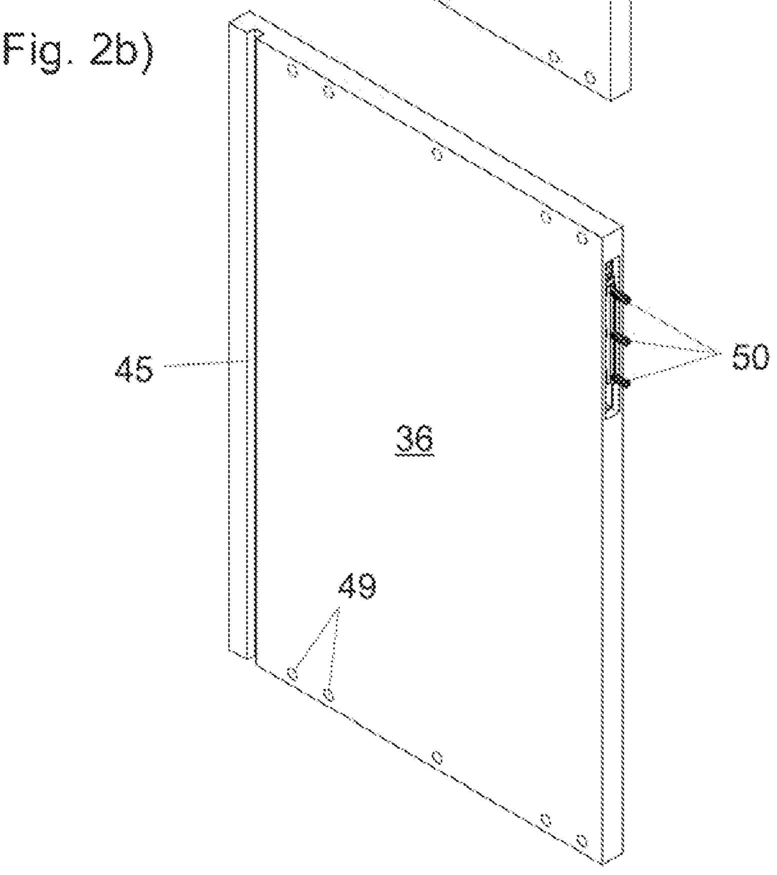
Figure 3A:
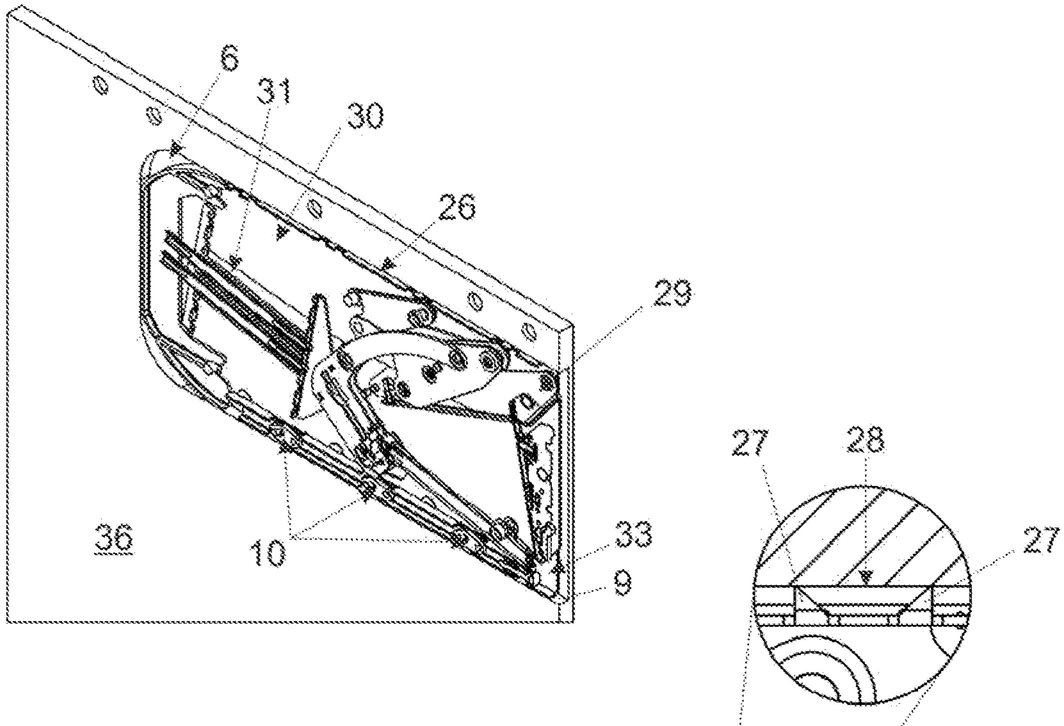
FIG. 3*a* shows a diagrammatically illustrated perspective sectional view and partial
Figure 3B:
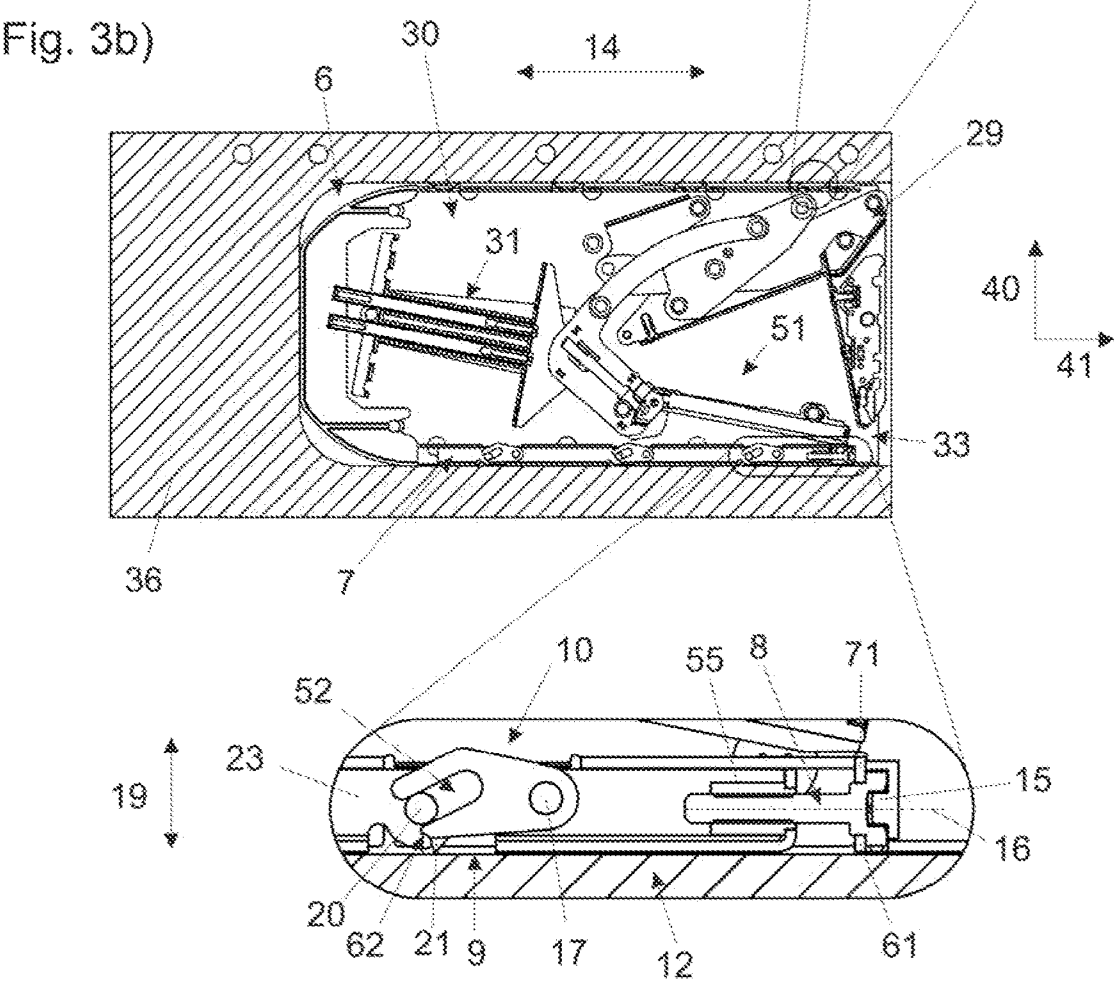
FIG. 3*b* shows a diagrammatically illustrated sectional view from the side, FIGS. 4*a, b* show a furniture fitment according to a first preferred embodiment inserted in a recess in a side wall in the fixed state, wherein partial
Figure 4A:
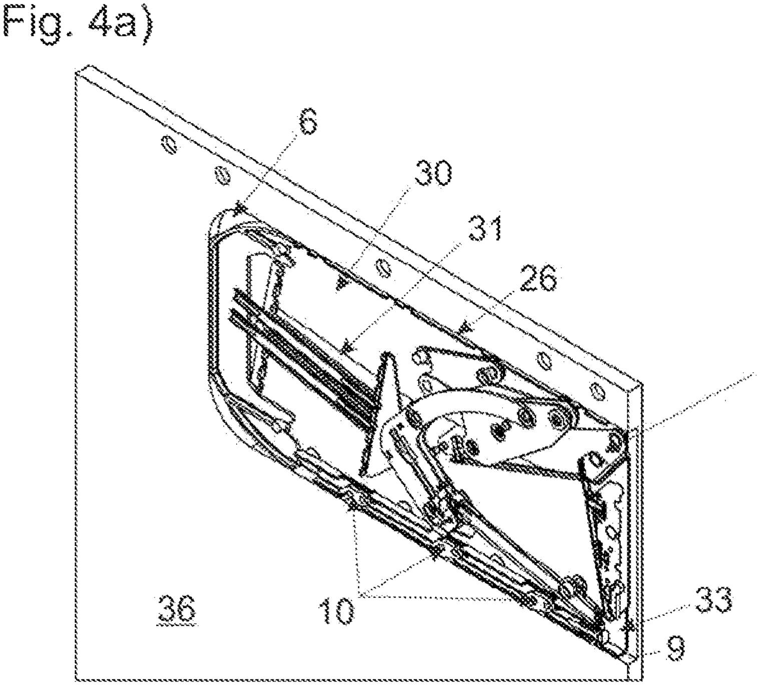
FIG. 4*a* shows a diagrammatically illustrated perspective sectional view and partial
Figure 4B:
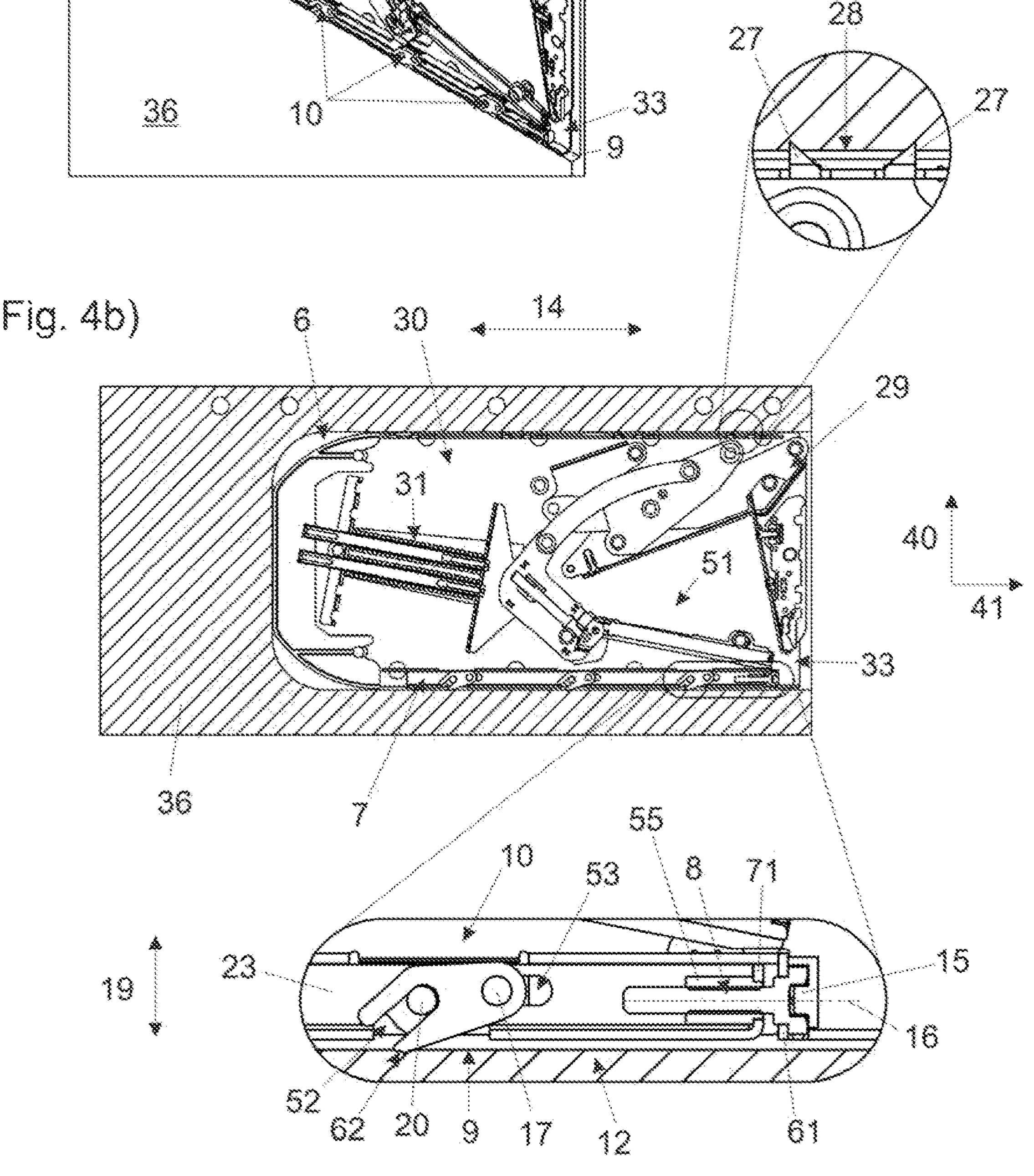
FIG. 4*b* shows a diagrammatically illustrated sectional view from the side.
Figure 5:
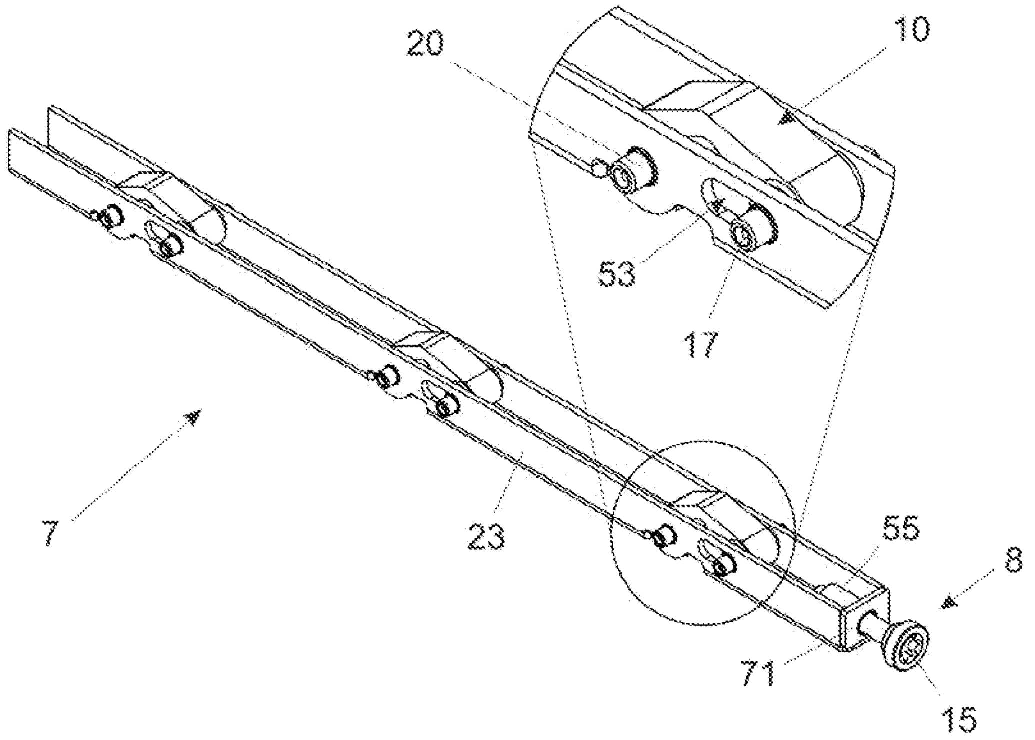
FIG. 5 is a diagrammatically illustrated perspective view of the fixing device contained in the furniture fitment according to the first preferred embodiment, FIGS. 6*a, b* are diagrammatically illustrated partial views of the fixing device contained in the furniture fitment according to the first embodiment from the side, wherein partial
Figure 6A:
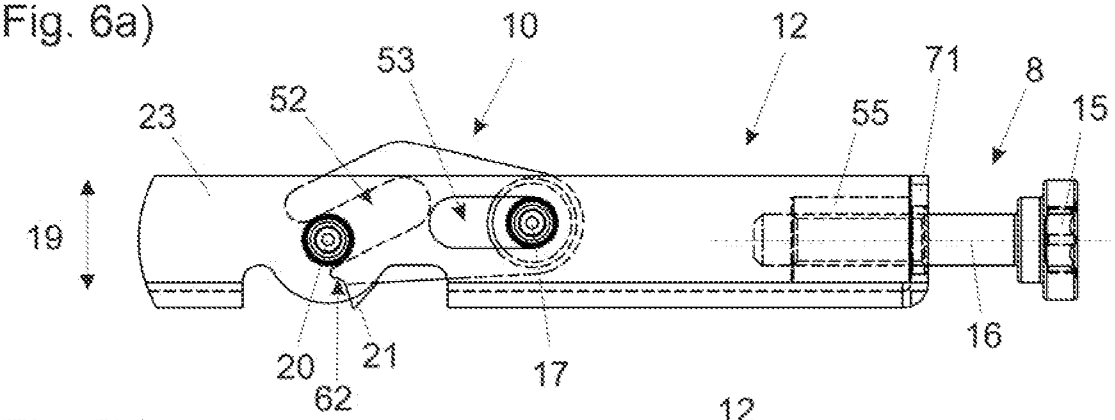
FIG. 6*a* shows an operating position corresponding to the non-fixed state and partial
Figure 6B:
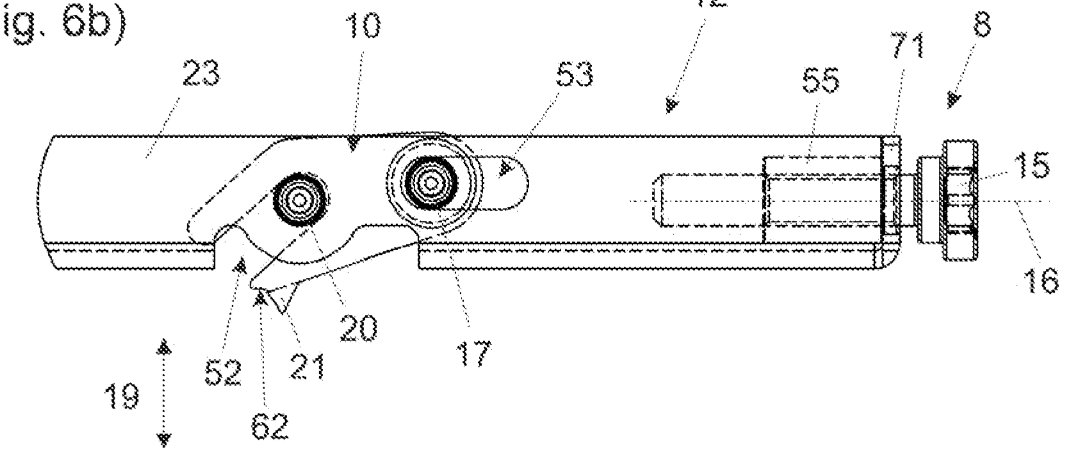
FIG. 6*b* shows an operating position corresponding to the fixed state, FIGS. 7*a, b* are diagrammatically illustrated sectional views from the side, of a furniture fitment according to a second preferred embodiment inserted in a recess in a side wall, wherein partial

FIGS. 2*a* and 2*b* show an arrangement of a side wall 36 of the furniture carcass 3 and a furniture fitment 1, wherein the furniture fitment 1 in FIG. 2*a* is arranged outside the side wall 36 and in FIG. 2*b* it is arranged in a recess 6 in the side wall 36.

The furniture fitment 1 has an actuating arm 29 and a housing 30. The actuating arm 29 is displaceable between a closed position in which the actuating arm 29 is arranged substantially in the interior of the housing 30 and at least one open position in which the actuating arm 29 is arranged at least region-wise outside the housing 30, wherein there is provided a force storage means 31 for applying force to the actuating arm 29. The force storage means 31 can include one or more springs.

The recesses 6 in the side walls 36 and the first fitment part 4 of the furniture fitments are of a substantially cuboidal configuration. The first fitment part 4, except for the end 32, is covered at five sides 13, 26, 37, 38, 39 by a material of the side wall 36, more specifically at a first longitudinal side 13 which at the same time is an underside, a second longitudinal side 26 which at the same time is a top side, a rear side 37, a first cover side 38 and a second cover side 39.

A groove 45 can be arranged in the side wall 36 for region-wise receiving a rear wall 46 of the furniture carcass 3. In addition there can be holes 49 for fixing means, with which the side wall 36 can be connected to the top panel 47 and the bottom panel 48.

FIGS. 3*a* through 6*b* show a first preferred embodiment of a furniture fitment 1 including a fixing device 7 for fixing the fitment part 4 of the furniture fitment 1 in the recess 6.

The fixing device 7 includes a rotatably mounted actuating element 8 and fixing elements 10 which can be sunk in a wall 9 of the recess 6 and can be pressed against the wall 9 of the recess 6.

The fixing elements 10 can be in the form of pivotal levers as in the illustrated case.

The fixing elements 10 include a cutting tooth 21 which can be of a substantially triangular configuration in cross-section. The fixing elements 10 further include a pressing surface 62 which can be oriented substantially parallel to the wall 9 of the recess 6.

The fixing elements 10 are mounted rotatably about an axis of rotation 17 oriented substantially perpendicularly to the longitudinal direction 14 of the at least one fitment part 4.

In this and the other illustrated embodiments the fixing elements 10 are rotatable in the same direction of rotation about the axis of rotation 17 in the course of the sinking movement and/or the pressing movement. In alternative embodiments it can be provided that the fixing elements are rotatable about the axis of rotation in opposite directions of rotation in the course of the sinking movement and/or the pressing movement.

There is provided a coupling device 12 with which a rotary movement of the actuating element 8 can be converted into a sinking movement of the cutting elements 21 and a pressing movement of the pressing elements 62.

The actuating element 8 and the fixing elements 10 are arranged at the same side 13, namely a lower longitudinal side of the fitment part 4 and spaced from each other in a longitudinal direction 14 of the fitment part 4.

Arranged at an end 32 of the fitment part 4 is an opening 33, by way of which the actuating element 8 of the fixing device 7 is actuable, more specifically even when the actuating arm 29 is arranged in a closed position.

The fixing device 7 is arranged at an underside 13 of the fitment part 4. The actuating element 8 is accessible from an end 32 of the furniture fitment 1, that is towards the user.

The actuating element 8 is in the form of a screw and has a tool receiving means 15 for actuation by means of a tool. The actuating element 8 is mounted rotatably about an axis of rotation 16 oriented substantially parallel to the longitudinal direction 14 of the fitment part 4.

The screw can engage into a counterpart element 55 having a counterpart thread. The actuating element 8 can be mounted to a counterpart support 61.

The fixing device 7 has a carrier 23 which is moveable by way of the actuating element 8 and on which the fixing elements 10 are arranged.

The carrier 23 is oriented in its longitudinal extent substantially parallel to the longitudinal direction 14 of the fitment part 4 and is in the form of a pull element which is displaceable in the longitudinal direction 14 of the fitment part 4.

The carrier 23 is moveable relative to the fixing elements 10. For that purpose there can be provided for example a slot 53.

There are provided stud-shaped deflector elements 20, by way of which the fixing elements 10 can be deflected at least in a direction 19 transversely relative to the longitudinal direction 14 of the fitment part 4.

As in the illustrated case the deflector elements 20 can respectively engage into a guide path 52 which can be of an open configuration at one end. As can be seen in particular from a comparison between FIGS. 6*a* and 6*b* the carrier 23 can be displaced in the longitudinal direction 14 of the fitment part 4 by actuation of the actuating element 8. In that situation the fixing elements 10 are pivoted in the direction of the wall 9 of the recess 6 and in so doing are at least region-wise sunk in the wall 9. At the same time the pressing surface 62 is oriented substantially parallel to the wall 9 and is pressed against the wall 9 of the recess 6. Fixing of the fitment part 4 in the recess 6 is effected by the fixing elements 10.

The fitment part 4 has a first longitudinal side 13 at which the fixing elements 10 are arranged, wherein the fitment part 4 has a second longitudinal side 26 which is opposite to the first longitudinal side 13 and at which further fixing elements 27 are arranged. The further fixing elements 27 are connected to the fitment part 4 in motionally coupled relationship and can be sunk into an oppositely disposed wall 28 of the recess 6 by the sinking movement of the cutting elements 21 arranged at the first longitudinal side 13 and the pressing movement of the pressing elements 62 arranged at the first longitudinal side 13 (see the two upper enlarged portions shown in FIGS. 3*b* and 4*b*).

By virtue of the sinking movement of the cutting elements 21 and the pressing movement of the pressing elements 62 the furniture fitment 1 is moveable in a vertical direction 40 by 0.5 mm through 2.0 mm and is substantially immovable in the horizontal direction 41.

Figure 7A:
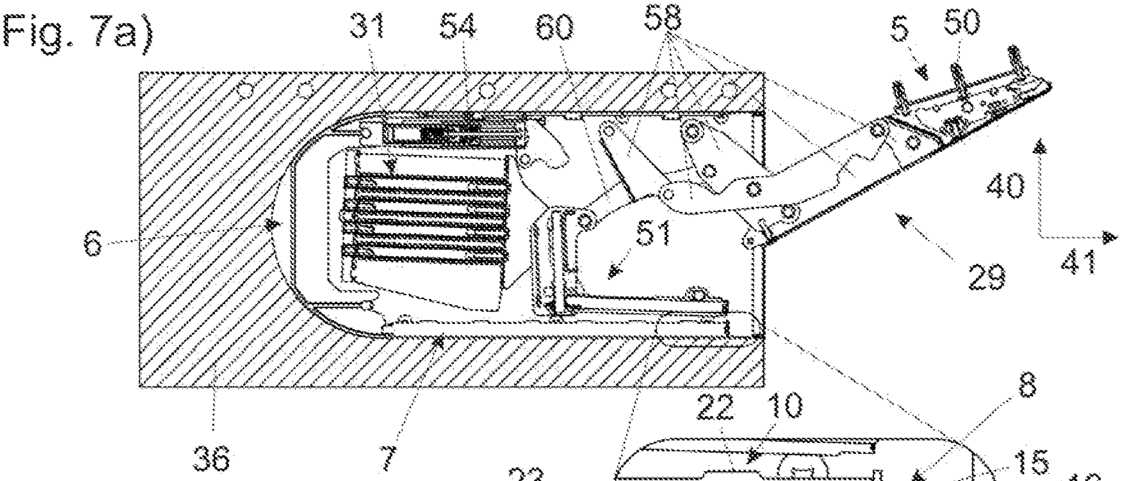
FIG. 7*a* shows the furniture fitment in the non-fixed state and partial
Figure 7B:
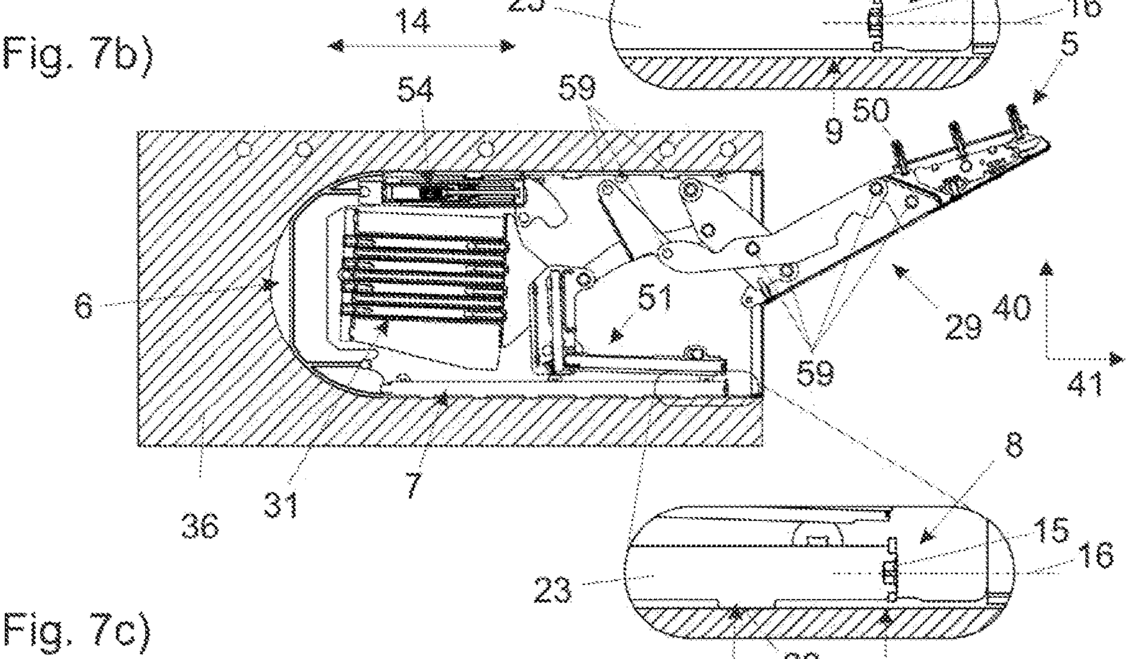
FIG. 7*b* shows the furniture fitment in the fixed state.
Figure 7C:
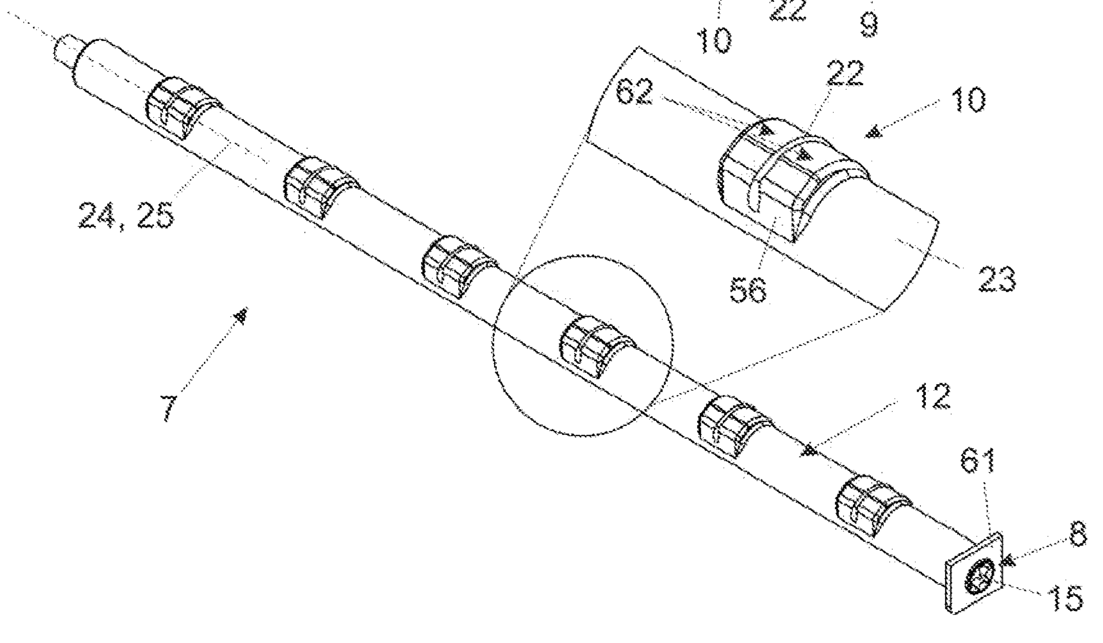
FIG. 7*c* is a diagrammatically illustrated perspective view of the fixing device contained in the furniture fitment according to the second preferred embodiment, FIGS. 8*a, b* are diagrammatically illustrated sectional views from the side, of the furniture fitment according to a third preferred embodiment inserted in a recess in a side wall, wherein partial

FIGS. 7*a* through 7*c* show a second preferred embodiment of a furniture fitment 1.

In this embodiment the fixing elements 10 are mounted rotatably about an axis of rotation 25 oriented substantially parallel to the longitudinal direction 14 of the fitment part 4.

In this case also the fixing elements 10 include cutting elements in the form of a cutting edge 22. In addition there are pressing elements which are in the form of pressing surfaces 62 which can be oriented substantially parallel to the wall 9 of the recess 6.

There is provided a carrier 23 oriented in its longitudinal extent substantially parallel to the longitudinal direction 14 of the fitment part 4. The carrier 23 is mounted rotatably about an axis of rotation 24 oriented substantially parallel to the longitudinal direction 14 of the fitment part 4. The cutting elements 22 and pressing elements 62 are arranged eccentrically on the carrier 23 and on common radial raised portions 56.

Fixing of the fitment part 4 is effected by the carrier 23 and therewith the cutting elements 22 and pressing elements 62 arranged thereon being rotated about the axis of rotation 24 and 25 respectively, by actuation of the actuating element 8. The eccentric arrangement means that, upon a rotation of the carrier 23, there is a reduction in the spacing of the cutting elements 22 and pressing elements 62 with respect to the wall 9 of the recess 6 until they are at least region-wise sunk in the wall 9 and pressed against the wall 9.

In this embodiment and in the other two embodiments the actuating arm 29 is formed from a plurality of articulated levers 58 pivotable about hinge axes 59. It is appropriate for the actuating arm 29 to be in the form of a 7-joint arrangement as in the illustrated case.

The actuating arm 29 is connected to the force storage means 31 by way of a force transmission lever 60.

There is provided an adjusting device 51, by way of which the magnitude of the force with which the actuating arm 29 can be acted upon is adjustable.

In addition, as in the illustrated case, there can be provided a damper 54 for damping the movement of the actuating arm 29, in particular for damping the movement of the actuating arm 29 into the closed position and/or into an opened end position.

Figure 8A:
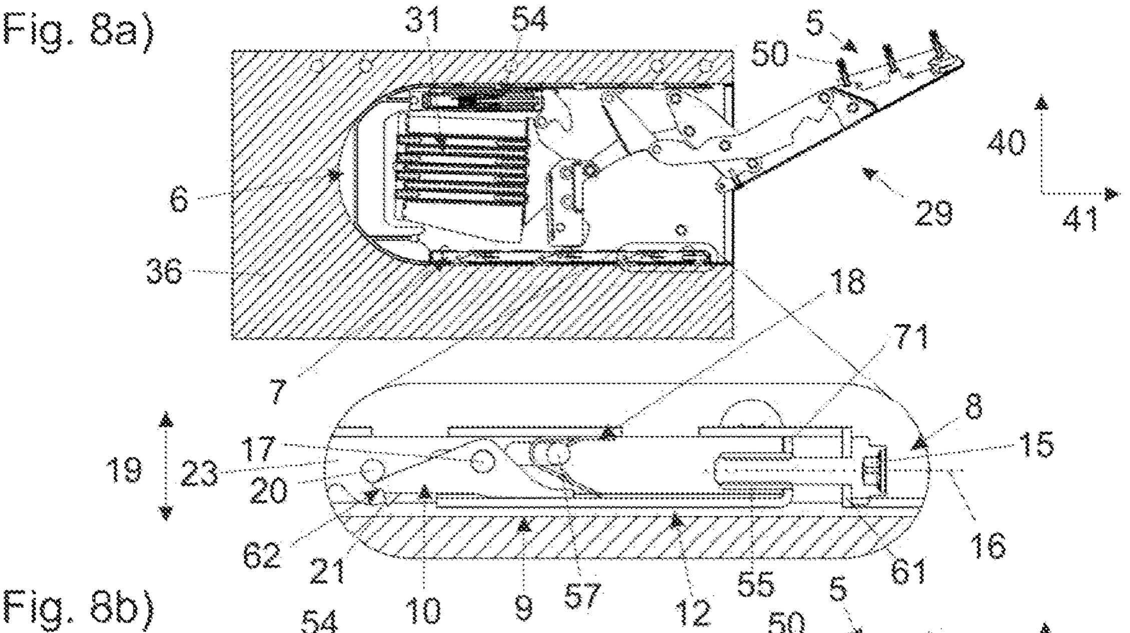
FIG. 8*a* shows the furniture fitment in the non-fixed state and partial
Figure 8B:
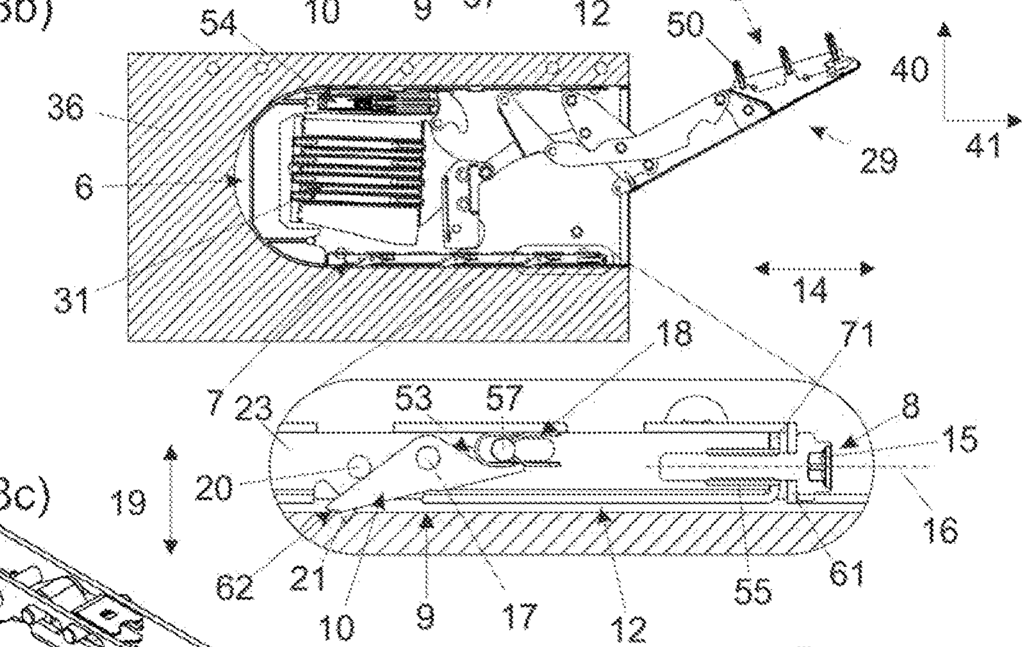
FIG. 8*b* shows the furniture fitment in the fixed state.
Figure 8C:
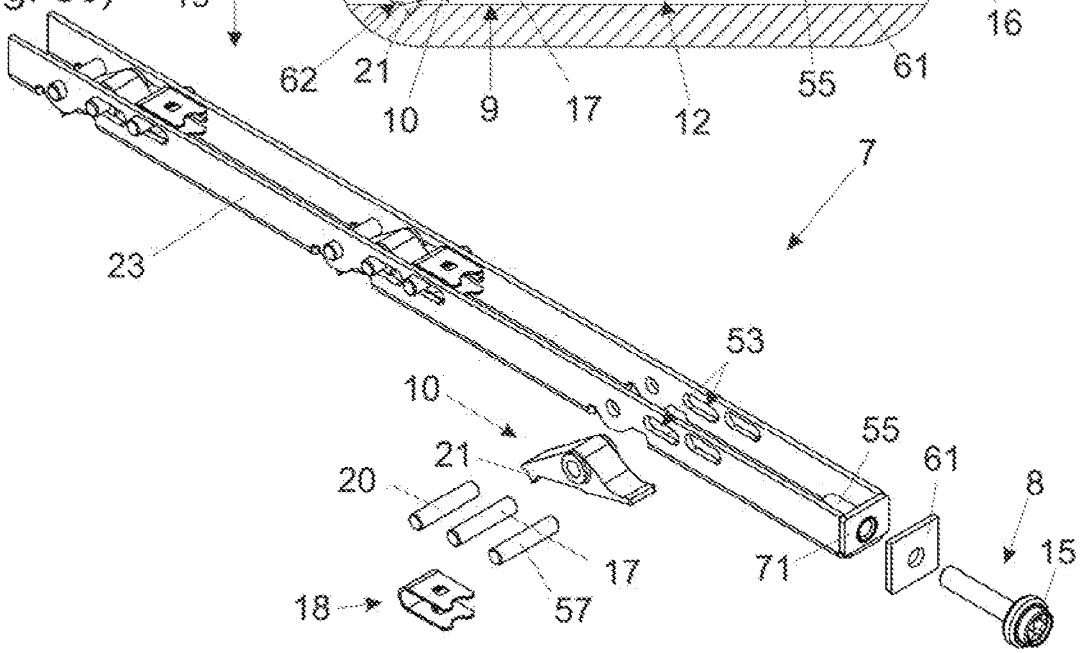
FIG. 8*c* is a diagrammatically illustrated perspective view of the fixing device contained in the furniture fitment according to the third preferred embodiment, FIG. 9*a* iss a diagrammatically illustrated perspective view of a furniture fitment according to a fourth embodiment.
Figure 9A:
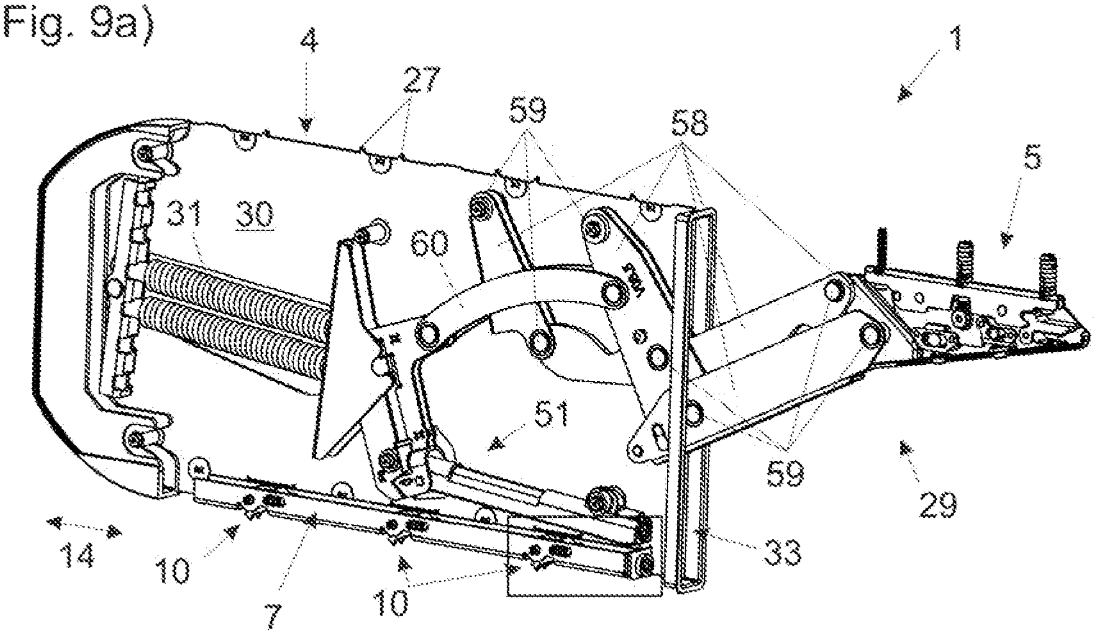
FIGS. 9*b-i* show a part of the fixing device contained in the furniture fitment according to the fourth preferred embodiment in diagrammatically illustrated views from the side (partial FIGS. 9*b* and 9*c*), cross-sectional views from the side (partial FIGS. 9*d* and 9*e*), perspective views (partial FIGS. 9*f* and 9*g*), an exploded perspective view (partial FIG. 9*h*) and a perspective cross-sectional view (partial FIG. 9*i*).
Figure 9B:
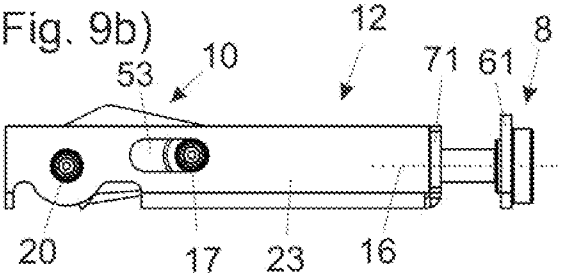
Figure 9C:
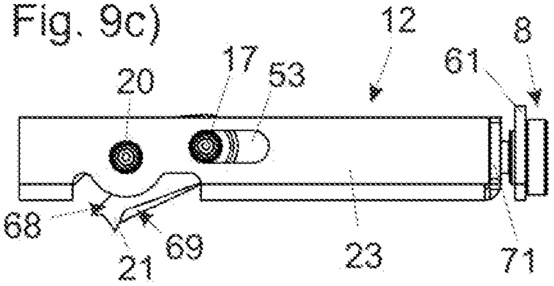
Figure 9D:
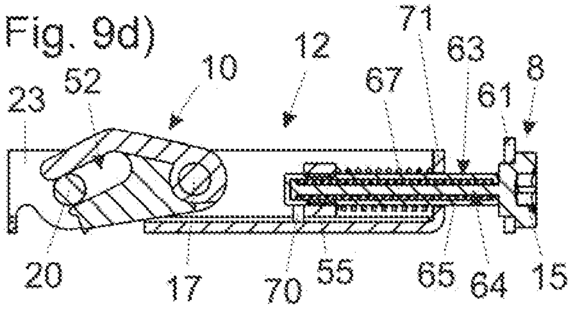
Figure 9E:
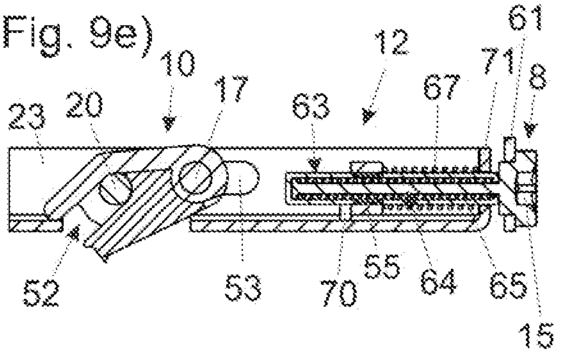
Figure 9F:
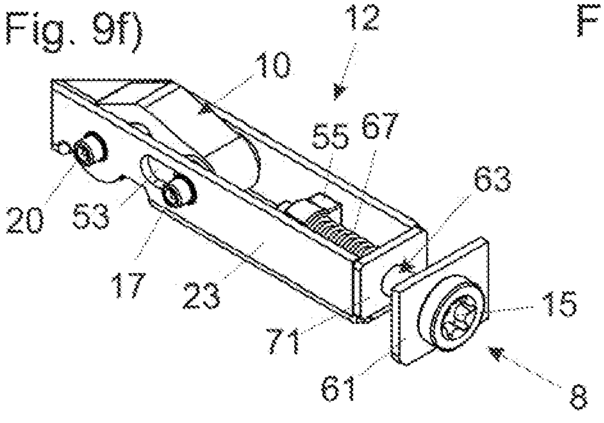
Figure 9G:
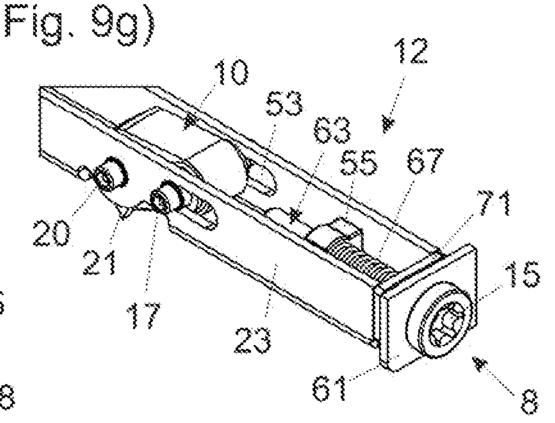
Figure 9H:
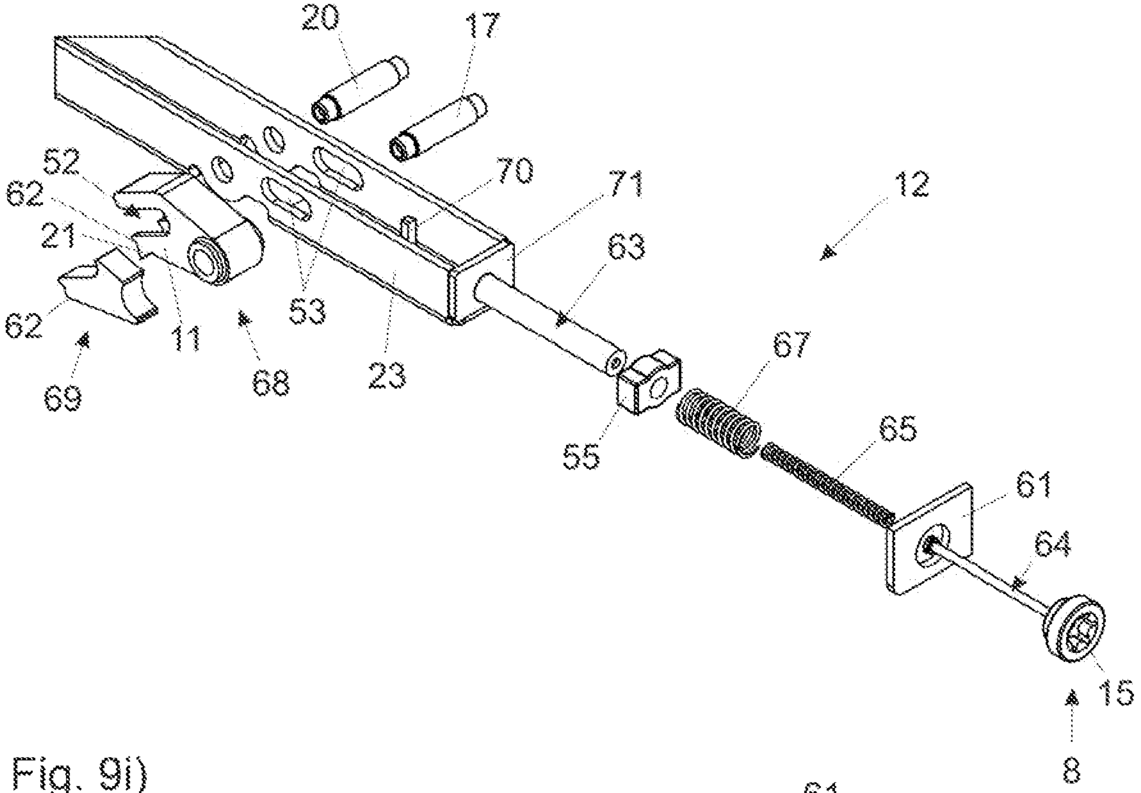
Figure 9I:
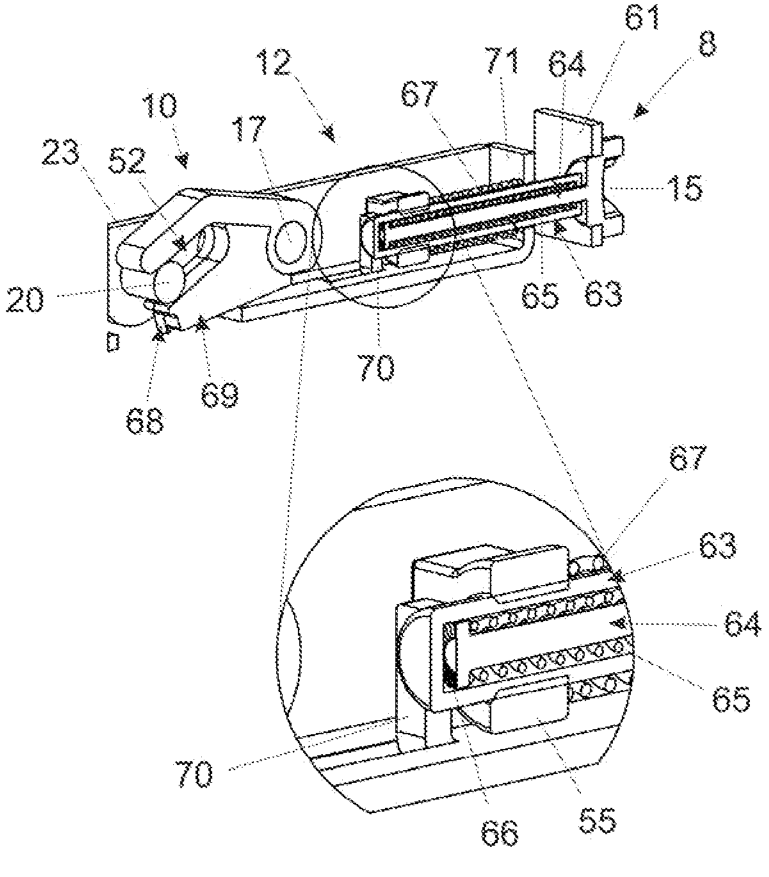

FIGS. 8*a* through 8*c* show a third preferred embodiment of a furniture fitment 1.

This embodiment has a close relationship to the first embodiment shown in FIGS. 3*a*-6*b*.

A difference is that there are provided spring elements 18 which act with a force on the fixing elements 10 at least in a direction 19 transversely relative to the longitudinal direction 14 of the fitment part 4. In that respect, as in the illustrated case, the fixing elements 10 can be acted upon with a force by the spring elements 18 in such a way that they are held in a position corresponding to the non-fixed state. Upon actuation of the actuating element 8 the fixing elements 10 are moved against that applied force in the direction of the wall 9 of the recess 6.

Spring mountings 57 can be provided for mounting the spring elements 18, which mountings 57 can be substantially of a stud configuration, as in the illustrated case.

FIGS. 9*a* through 9*i* show a fourth preferred embodiment of a furniture fitment 1.

This embodiment provides an overload protection means for limiting a tightening torque of the actuating element 8.

The overload protection is implemented by the actuating element 8 being made up from two parts 63, 64, wherein the two parts 63, 64 are region-wise in frictionally locking contact with each other below a predetermined tightening torque so that a torque can be transmitted between the two parts 63, 64, and wherein, when the predetermined tightening torque is exceeded, the contact can be at least partially removed so that substantially no torque can be transmitted between the two parts 63, 64.

One of the two parts 63, 64 of the actuating element 8, namely the part denoted by reference 63, is in the form of a threaded sleeve. The other part denoted by reference 64 is mounted rotatably region-wise within the threaded sleeve.

The arrangement has a spring 65 which in the illustrated case is in the form of a compression spring, by way of which the two parts 63, 64 can be held in contact with a predetermined force.

There is provided a friction surface 66 having an increased level of friction, by way of which the two parts 63, 64 are region-wise in frictionally locking contact with each other below the predetermined tightening torque. The friction surface 66 is arranged at an end of the part 64 and below the predetermined tightening torque is in contact with an inside surface of the threaded sleeve 63. That inside surface can also have an increased level of friction. The increased friction of the friction surface 66 and/or the inside surface of the threaded sleeve 63 can be achieved by a surface structure, for example a fluting or the like.

In this and the above-described embodiments the fixing elements 10 include both at least one cutting element in the form of a cutting tooth 21 or a cutting edge 22 and also at least one pressing element in the form of at least one pressing surface 62 which can be oriented substantially parallel to the wall 9 of the recess 6.

In the first three embodiments the at least one cutting element 21, 22 and the at least one pressing element 62 are connected in one piece with the fixing elements 10.

In the fourth embodiment the at least one cutting element 21 is arranged on a first component 68 of the fixing elements 10 and the at least one pressing element 62 is arranged on a second component 69 of the fixing elements 10, wherein the first component 68 substantially comprises a hard material, for example steel, and the second component 69 substantially comprises a soft material, for example plastic.

The first component 68 is region-wise of a U-shaped configuration in cross-section and the second component 69 is arranged region-wise between the limbs 11 of the U-shape. The first component 68 and the second component 69 bear region-wise against each other in sandwich relationship. The fourth embodiment has a resetting force storage means 67 which applies a resetting force to the fixing elements 10 at least in a direction transversely relative to the longitudinal direction 14 of the fitment part 4 so that the fixing elements 10 can be at least region-wise sunk into and/or pressed against the wall 9 of the recess 6 in time-displaced relationship after a first fixing of the fitment part 4 in the recess 6.

As in the illustrated case the resetting force storage means 67 can be in the form of a compression spring and can be arranged between a counterpart element 55 for the actuating element 8 and a carrier 23 at which the fixing elements 10 are arranged.

The counterpart element 55 which as in the illustrated case can be in the form of a nut bears against a first leg 70 of the carrier 23.

The carrier 23 has a second leg 71 against which the resetting force storage means 67 bears.

The invention claimed is:

1. A furniture hinge for moveably mounting a furniture part relative to a furniture body, comprising:

a first hinge part to be fixed to the furniture body;

a second hinge part to be fixed to the moveably mounted furniture part, the first and second hinge parts being pivotably connected together, wherein one of the first and second hinge parts is adapted to be arranged completely in a recess in the furniture body or in the moveably mounted furniture part; and a fixing device arranged inside a housing of the first hinge part, wherein the fixing device includes:

a rotatably mounted actuator;

at least two fixing elements, wherein the at least two fixing elements are configured to be at least partially sunk directly into a first wall of the recess via a first opening in the housing or to be pressed directly against the first wall of the recess via the first opening in the housing, wherein the actuator and the at least two fixing elements are arranged at a same side of the first hinge part and are spaced from each other in a longitudinal direction of the first hinge part; and a carrier configured to convert a rotary movement of the actuator into a movement of the at least two fixing elements in a direction transverse to the longitudinal direction, wherein the fixing device is adapted to be arranged completely in the recess together with the first hinge part and is configured to fix the first hinge part in the recess, wherein the actuator is arranged entirely inside of the housing of the first hinge part and is mounted about an axis of rotation oriented substantially parallel to the longitudinal direction of the first hinge part, and wherein a second opening is disposed at an end of the housing of the first hinge part, and wherein the actuator of the fixing device is actuable from an outside of the housing of the first and hinge part via the second opening.

2. The furniture hinge as set forth in claim 1, wherein the actuator is in the form of a screw, and wherein the actuator has at least one tool receiving means for actuation by a tool.

3. The furniture hinge as set forth in claim 1, further comprising an overload protection means for limiting a tightening torque of the actuator, wherein the actuator is made up at least of two parts, wherein the at least two parts are at least partially in frictionally locking contact with each other below a predetermined tightening torque so that a torque can be transmitted between the at least two parts, and wherein the frictionally locking contact can be at least partially removed when the predetermined tightening torque is exceeded so that substantially no torque can be transmitted between the at least two parts.

4. The furniture hinge as set forth in claim 3, wherein one of the at least two parts of the actuator is in the form of a threaded sleeve and the other of the at least two parts is at least partially mounted rotatably within the threaded sleeve, or wherein the at least two parts are held in contact with a predetermined force by at least one spring, or wherein the at least two parts are at least partially in frictionally locking contact below the predetermined tightening torque via at least one friction surface.

5. The furniture hinge as set forth in claim 1, wherein the at least two fixing elements are mounted rotatably about an axis of rotation which is oriented substantially perpendicular to the longitudinal direction of the first hinge part.

6. The furniture hinge as set forth in claim 1, further comprising at least one spring element which applies a force to the at least two fixing elements at least in the direction transverse to the longitudinal direction of the first hinge part.

7. The furniture hinge as set forth in claim 1, further comprising at least one stud, by way of which at least one of the at least two fixing elements can be deflected at least in the direction transverse to the longitudinal direction of the first hinge part.

8. The furniture hinge as set forth in claim 1, wherein each fixing element of the at least two fixing elements comprises a cutting tooth or a pressing surface which can be oriented substantially parallel to the first wall of the recess.

9. The furniture hinge as set forth in claim 8, wherein at least one fixing element of the at least two fixing elements includes both the cutting tooth and the pressing surface, the cutting tooth and the pressing surface being connected in one piece to the at least one fixing element.

10. The furniture hinge as set forth in claim 8, wherein at least one fixing element of the at least two fixing elements includes both the cutting tooth and the pressing surface, wherein the cutting tooth is arranged at a first component of the at least one fixing element and the pressing surface is arranged at a second component of the at least one fixing element, wherein the first component comprises substantially a first material and the second component comprises substantially a second material, and wherein the first material is harder than the second material.

11. The furniture hinge as set forth in claim 10, wherein the first component is at least partially of a U-shaped configuration in cross-section and the second component is arranged at least partially between the limbs of the U-shape, or wherein the first component and the second component at least partially bear directly against each other.

12. The furniture hinge as set forth in claim 1, wherein the carrier is moveable by way of the actuator, and the at least two fixing elements are arranged at the carrier.

13. The furniture hinge as set forth in claim 12, wherein the carrier is oriented in its longitudinal extent substantially parallel to the longitudinal direction of the first hinge part, and wherein the carrier is displaceable in the longitudinal direction of the first hinge part.

14. The furniture hinge as set forth in claim 12, wherein the carrier is moveable relative to the at least two fixing elements.

15. The furniture hinge as set forth in claim 1, further comprising a resetting force storage means which applies a resetting force to the at least two fixing elements at least in the direction transverse to the longitudinal direction of the first and hinge part so that the at least two fixing elements can be at least partially sunk directly into or pressed directly against the first wall of the recess in a time-displaced relationship after a first fixing of the first hinge part in the recess.

16. The furniture hinge as set forth in claim 15, wherein the resetting force storage means is arranged between a counterpart element for the actuator the carrier, the at least two fixing elements being arranged at the carrier.

17. The furniture hinge as set forth in claim 16, wherein the counterpart element has a counterpart thread for the actuator.

18. The furniture hinge as set forth in claim 1, wherein the first hinge part has a first longitudinal side at which the at least two fixing elements are arranged, wherein the first hinge part has a second longitudinal side which is opposite the first longitudinal side and at which at least one further fixing element is arranged.

19. The furniture hinge as set forth in claim 18, wherein the at least one further fixing element is connected to the first hinge part so as to be movable together with the first hinge part.

20. The furniture hinge as set forth in claim 18, wherein the at least one further fixing element is configured to be sunk into a second wall of the recess by a movement of the first hinge part in the direction transverse to the longitudinal direction which is caused by the movement of the at least two fixing elements in the direction transverse to the longitudinal direction, the second wall of the recess being opposite the first wall of the recess.

21. The furniture hinge as set forth in claim 1, further comprising an actuating arm, wherein the actuating arm is displaceable between a closed position in which the actuating arm is arranged substantially in an interior of the housing of the first hinge part and an open position in which the actuating arm is arranged at least partially outside the housing.

22. The furniture hinge as set forth in claim 21, further comprising a force storage means for applying force to the actuating arm.

23. The furniture hinge as set forth in claim 1, further comprising an actuating arm that is displaceable between a closed position and an open position, wherein the actuating element is actuable via the second opening when the actuating arm is arranged in the closed position.

24. An article of furniture comprising:

a furniture body;

a furniture part which mounted to the furniture body so as to be moveable relative to the furniture body; and at least one furniture hinge, wherein the at least one furniture hinge is the furniture hinge as set forth in claim 1, wherein the first hinge part of the at least one furniture hinge is fixed to the furniture body and the second hinge part of the at least one furniture hinge is fixed to the moveably mounted furniture part.

25. The article of furniture as set forth in claim 24, wherein the furniture part is a furniture flap that is moveable relative to the furniture body about a horizontal axis, and wherein the at least one furniture hinge includes precisely two furniture hinges.

26. The article of furniture as set forth in claim 24, wherein the furniture body includes a side wall, wherein a recess is arranged in the side wall and the first hinge part is arranged completely in the recess.

27. The article of furniture as set forth in claim 26, wherein the recess or the first hinge part is of a substantially cuboidal configuration, and the first hinge part is covered on at least four sides by a material of the side wall.

28. The article of furniture as set forth in claim 24, wherein the fixing device is arranged at an underside of the first hinge part, or the actuator is accessible from an end of the first hinge part that faces toward a user.

29. The article of furniture as set forth in claim 24, wherein the first hinge part is moveable by a sinking movement or pressing movement of the at least two fixing elements in a vertical direction by 0.5 mm through 2.0 mm.

30. The article of furniture as set forth in claim 29, wherein the first hinge part is substantially immovable in a horizontal direction.

31. The furniture hinge as set forth in claim 1, wherein the moveably mounted furniture part is a furniture flap, wherein the first hinge part is adapted to be arranged completely in the recess, and, wherein the actuator and the at least two fixing elements are arranged at a same longitudinal side of the first hinge part.

* * * * *